United States Patent [19]
Bock et al.

[11] 3,974,240
[45] Aug. 10, 1976

[54] THERMOPLASTIC ELASTOMER COMPOSITIONS

[75] Inventors: Jan Bock, Piscataway; Robert D. Lundberg, Somerville; Robert R. Phillips, Spring Lake Heights; Henry S. Makowski, Scotch Plains, all of N.J.

[73] Assignee: Exxon Research and Engineering Company, Linden, N.J.

[22] Filed: Nov. 18, 1974

[21] Appl. No.: 524,502

[52] U.S. Cl. .................... 260/897 B; 260/23.5 A; 260/889
[51] Int. Cl.$^2$ ................ C08L 23/16; C08L 23/12; C08L 23/06
[58] Field of Search ............ 260/897 A, 897 B, 889

[56] References Cited
UNITED STATES PATENTS

| | | | |
|---|---|---|---|
| 3,642,728 | 2/1972 | Canter | 260/79.3 R |
| 3,758,643 | 9/1973 | Fisher | 260/897 A |

*Primary Examiner*—Carman J. Seccuro
*Attorney, Agent, or Firm*—R. J. Baran

[57] ABSTRACT

This invention relates to processable ionic elastomer compositions having improved compression set properties, especially at elevated temperatures. In this invention an intractable ionic elastomer, for example, a sulfonated elastomer is blended with from 10 to 70 parts per hundred of a crystalline polyolefin to yield novel compositions having the above properties. Preferably the ionic elastomer is a sulfonated ethylene propylene terpolymer having from about 0.2 to 20 mole percent sulfonate groups, at least 95% of which are combined with counterions selected from the group consisting of Groups IA, IIA, IB, and IIB of the Periodic Table of Elements, aluminum, antimony, lead, and mixtures thereof. The sulfonated polymer is combined with said counterions by neutralization of a polysulfonic acid precurser with a basic material in which the desired counterion is present as the cation thereof. The anion of said basic material is preferably selected from the group consisting of oxide, hydroxide, and lower alkanoates, for example, acetate, formate, and propionate.

12 Claims, No Drawings

THERMOPLASTIC ELASTOMER COMPOSITIONS

FIELD OF THE INVENTION

This invention relates to processable ionic elastomer compositions having improved compression set properties, especially at elevated temperatures. In this invention and intractable ionic elastomer, for example, a sulfonated elastomer is blended with from 10 to 70 parts per hundred of a crystalline polyolefin to yield novel compositions having the above properties. Preferably the ionic elastomer is a sulfonated ethylene propylene terpolymer having from about 0.2 to 20 mole percent sulfonate groups, at least 95% of which are combined with counterions selected from the group consisting of Groups IA, IIA, IB, and IIB of the Periodic Table of Elements, aluminum, antimony, lead, and mixtures thereof. The sulfonated polymer is combined with said counterions by neutralization of a polysulfonic acid precurser with a basic material in which the desired counterion is present as the cation thereof. The anion of said basic material is preferably selected from the group consisting of oxide, hydroxide, and lower alkanoates, for example, acetate, formate, and propionate.

BACKGROUND OF THE PRIOR ART

Ionic elastomers such as solfonated ethylene-propylene-ethylidene norbornene terpolymer (Sulfo-EPT) have been developed recently. See U.S. Pat. No. 3,642,728. These materials under carefully controlled conditions can be formulated or compounded to produce products which can be processed at elevated temperature as thermoplastics, yet at ambient temperature, possess the rubbery character of vulcanized elastomers. These systems are similar to a new class of materials, designated as thermoelastomers.

While the properties of these materials, such as Sulfo-EPT, are similar to those of vulcanized elastomers in many respects, they are markedly deficient in one important area, i.e. compression set. Compression set, as described under ASTM test conditions, (ASTM D-395), is a measure of an elastomeric material's ability to recover its original shape, after being subjected to a severe compressive load (25% reduction in thickness) for extended time periods (usually 22 hours). While vulcanized elastomers often possess compression set values for room temperature compression of 20 to 25%, and values of 30% or so at compressive load temperatures of 70°C., the values obtained for Sulfo-EPT are much worse. For example, it is common to observe values of compression set at room temperature for Sulfo-EPT based materials on the order of 50 to 80%. At a temperature of 70°C., the compression set values are substantially worse, being on the order of 95–100%. In practical terms this means that such Sulfo-EPT compositions are severely limited in their potential applications at temperatures which are near 70°C. or above. In effect, at such temperatures it appears that Sulfo-EPT based systems undergo a certain amount of irrecoverable flow when placed under compressive load. Such a deficiency signifies that Sulfo-EPT based materials may not compete in those applications wherein compression set is important such as gaskets, automotive coolant hose, and many sealant uses.

Therefore, it is clear that it would be extremely desirable to improve this characteristic of Sulfo-EPT. However, such an improvement should not be achieved at a major sacrifice in polymer fabricability. For example, it has been shown that Sulfo-EPT when prepared with a suitable sulfonate level, and with a suitable cation can possess good compression set properties. However, when attempts are made to process such materials even at very high temperatures, it becomes evident that these materials are not processable under practical conditions such as extrusion, injection molding, or even compression molding. Therefore, the combination of good compression set (i.e., values below 80% at 70°C.) and ease of fabrication (i.e., processability) has never been observed with a material based on Sulfo-EPT.

SUMMARY OF THE INVENTION

Ionic elastomer compositions having improved processability and compression set may be prepared by blending an intractable ionic elastomer with a minor amount of a crystalline polyolefin. The ionic elastomer comprises pendant ionic groups, e.g. carboxylate, phosphonate, and sulfonate groups. Preferably the backbone of the ionic elastomer is the sulfonated derivative of an elastomer for example, a sulfonated butyl rubber or a sulfonated ethylene propylene terpolymer.

The crystalline polyolefin is characterized as a polymer of an alpha-olefin having a molecular weight of at least 2,000, preferably at least 10,000, and more preferably at least 20,000. This material comprises substantially an olefin but may incorporate other monomers, for example, vinyl acetate, acrylic acid, methyl acrylate, ethyl acrylate, sodium acrylate, methyl methacrylate, ethyl methacrylate, methacrylic acid, sodium methacrylate, etc. The preferred polyolefins are selected from the group consisting of polymers of $C_2$ to $C_4$ alpha-olefins. Most preferably the polyolefins are selected from the group consisting of polyethylene, polybutene, polypropylene, and ethylene-propylene copolymers. It is critical that the crystalline polyolefin have a degree of crystallinity of at least 25% and most preferably at least 40%.

Both high and low density polyethylene are within the scope of the instant invention. For example, polyethylenes having a density from 0.90 to 0.97 gms./cc. are generally included. Polypropylene polymers having intermediate and high densities are the preferred examples of the polypropylene materials useful in the instant invention. These materials will have a density from 0.88 to 0.925 gms./cc. The polyethylene or polypropylene can also be combined as copolymers thereof so long as adequate crystallinity is obtained in said combination. Thus, block copolymers wherein polyethylene or polypropylene is present in crystalline form are effective.

The sulfonated polymers of the instant invention comprise from about 0.2 to about 20 mole % sulfonate groups, preferably from 0.2 to about 5 mole %. At least 95% of said sulfonate groups are combined with metal counterions selected from the group consisting of Groups I and II, of the Periodic Table of the Elements, aluminum, antimony, lead, and mixtures thereof. Preferably, however, at least 98% of said sulfonate groups are so combined and most preferably 100% are so combined. The preferred metal counterions are selected from the group consisting of magnesium, calcium and barium.

The sulfonated polymers used in the instant invention are the sulfonated, nonaromatic hydrocarbon polymers described in U.S. Pat. No. 3,642,728 herein incorporated by reference. This patent discloses various sulfonated polymers including sulfonated butyl, sulfonated ethylene propylene terpolymer (EPT), sulfonated polybutadiene, etc. in both the acid and the salt forms. In contrast to the broad disclosure of said patent, the sulfonated polymers useful in the instant invention are limited only to those specific sulfonated polymers described herein as intractable. It has been found that there are critical parameters which must be met in order to provide sulfonated polymer compositions having improved compression set and processability; thus, the limited range of sulfonate groups and the specific choice of neutralization agents allowable in the sulfonated polymers useful in the instant invention.

It has been found that unlike the compositions of the patent described above, whereby the compositions of the sulfonated polymer are characterized as being moderately processable in their own right, the compositions of the sulfonated elastomers of the instant invention must be characterized as intractable. The operational definition of the term intractable involves either capillary rheometer measurements at 200°C. or milling characteristics at 150°C. In the first instance an Instron capillary rheometer with a 1.05 foot × .05 inch (90° entrance angle) capillary was employed to investigate the rheological behavior of the sulfonated elastomer at 200°C. Apparent shear stress values as a function of shear rate in the shear rate range from 0.29 sec$^{-1}$ to 3000 sec$^{-1}$ were obtained. The rheological criterion of intractability in the sulfonated elastomers useful in the instant invention exhibit a viscosity number defined as a shear stress (at a shear rate of 0.74 sec$^{-1}$) of at least $1 \times 10^6$ dynes/cm$^2$ in conjunction with severe melt fracture at shear rates as low as 200 sec$^{-1}$ and preferably at shear rates as low as 100 sec$^{-1}$. At shear rates greater than 300 sec$^{-1}$ the extruded capillary strands are incoherent and extrude as powders or crumb. Clearly these materials are nonprocessable by extrusion or injection molding or any high shear processing techniques. Compression molding these materials results in articles which have not fused properly as determined by both visual observation and the lack of adequate physical property development. The mill behavior of the acceptable sulfonated elastomers are described as incoherent at 300°F. However, as the mill temperature is increased, the polymers may become somewhat more coherent, but even at mill temperatures of 450°F. the preferred materials are still not completely coherent. Thus the acceptable sulfonated elastomers are intractable or nonprocessable under typical polymer processing conditions however, unexpectedly they are processable when blended with a minor amount of the above described crystalline polyolefins. Furthermore, these blends can even show improved compression set as compared to the sulfonated polymer above due to the improved fusion of the molded article.

Due to the intractable nature of the preferred sulfonated elastomer compositions, it is difficult to obtain reliable physical property measurements such as tensile strength, compression set, etc. However, by use of volatile plasticizer techniques or extreme molding conditions (i.e., high temperature, high pressure) compression molded articles can be obtained and physical properties determined. In general the tensile properties of the sulfonated elastomer of the instant invention are relatively temperature insensitive when compared to the compositions of the above noted patent, as are the compression set properties. The ratio of the tensile strength of the sulfonated elastomers, useful in the instant invention, at ambient conditions i.e., 23°C. to that at 100°C. will be less than 20, more preferably less than 15 and most preferably less than 10.

Neutralization of the above described sulfonic acid polymer precursor is carried out by means known in the art, for example, see the above patent. However, it has been found that unlike the compositions of the patent described above, wherein the salts of the sulfonated polymer are prepared by neutralization with any basic material which contains the desired counterion, in the compositions of the instant invention only specific anions may be present in the neutralization agent. Thus, the anion present in the neutralization agent is selected from the group consisting of oxide, hydroxide and the lower alkanoates, for example formate, acetate and propionate.

This limitation is necessary since the composition of the instant invention should not contain substantial quantities of agents which can disrupt the ionic associations of the neutralized sulfonate species in the use temperature region. Thus, materials such as alcohols, long chain acids, amines, and similar polar materials with melting points less that 70°C. which can be formed in situ with, for example, alcoholate, long chain alkanoate, etc. type neutralizing agents should not be present in order that optimum properties be obtained. Modest quantities (about 1% or less) of such materials will not normally have a major effect.

While not wishing to be bound by theory, it is felt that the sulfonated elastomer retains substantial ionic association at high temperatures and thus does not undergo conventional plastic flow. Consequently, the elastomer phase possesses substantial elastic recovery after deformation even at elevated temperatures.

As described above, the crystalline polyolefin which is blended with the above described sulfonated elastomers is preferably selected from the group consisting of polyethylene, polypropylene, and ethylene-propylene copolymers. These polymers are characterized as having a degree of crystallinity of at least 25%, preferably at lest 40%. The crystalline polyolefin will also have a melting point of at least 50°C., preferably at lest 70°C. The crystalline polyolefin is blended with the intractable polymer described above at a level of at least 10 parts per hundred, preferably from 20 to 90 parts per hundred, and more preferably from 30 to 70 parts per hundred of intractable polymer. It is believed that the crystalline polyolefin functions by melting at elevated temperatures to provide a suitable degree of compatability and improved flow. As the temperature is lowered, the compatability of olefin decreases, and it separates out as a dispersed phase in a continuous sulfonate polymer matrix. As the temperature is lowered, the sulfonate groups associate to provide the desired physical properties.

The crystalline polyolefins suitable for this invention can vary greatly in molecular weight from as low as 2000 up to and exceeding 200,000. The preferred molecular weight range is from 4000 to 150,000. If the molecular weight of the polyolefin is too low, the crystalline polyolefin is essentially a wax. While effective in lowering the melt viscosity of the blend, such waxes do not improve strand quality in extruded articles and the physical properties of such blends are generally inferior to those of higher molecular weight polyolefins. However, low molecular weight crystalline polyolefins, waxes, may be used at low levels in conjunction with the defined polyolefins as viscosity reducers. For very high molecular weight polyolefins, the resulting blends exhibit excellent physical properties but poor processability. In these cases, the addition of a minor amount, e.g., from 2 to 30 phr. based on the ionic polymer, of a compatible wax would be advantageous. However, the total amount of wax and defined polyolefins should be in a minor amount in relation to the sulfonated elastomer.

If the molecular weight of the polyolefin is too low, then noncrystalline products or oils result. While such oils classified as paraffinic oils are fairly compatible with the sulfonated elastomer, the resulting blend neither exhibits the acceptable flow behavior for processing nor the requisite physical properties. Table VI illustrates these observations. An unexpected result shown in the table involves the viscosity level of the resulting blend. If the blends were purely physical in nature then a property of the blend should be a weighted average of the property of the constituents of said blend. While the viscosity of the parafinic oil used for blend 2 is much lower than that of the polyolefins used in blend 1, the viscosity of the blend resulting from the polyolefin is ½ that of the blend resulting from the oil. This is clearly unexpected on the basis of purely physical blending of two materials. The table further illustrates that the use of oils in such blends is not within the scope of this invention.

The use of polyolefins not possessing the requisite degree of crystallinity also results in blends which are unacceptable from either a physical property basis and/or a processability basis. Two example in Table VI illustrate these points. Blend 3 with a low molecular weight EPDM exhibits marginal processability at 200°C. and extremely poor physical properties. Blend 4 with atactic polypropylene exhibits an acceptable viscosity level but early melt fracture in conjunction with unacceptable tensile properties. Thus polyolefins with negligible levels of crystallinity are not within the scope of this invention.

Compatability of the sulfonated elastomer with the nonsulfonated polymer is essential to develop the propertyrheology balance of this invention. The use of polyaromatics and glassy plastics such as polymethylmethacrylate, polyvinyl acetate, polystyrene, etc. in such blends are not within the scope of this invention due to incompatability with the ionic elastomer. The resulting blends exhibit this incompatability through poor physical properties, i.e., low tensiles, low elongation and/or unacceptable processability (incoherent extrudates). This behavior will be illustrated in subsequent examples.

It is readily apparent that ternary or higher blends of several crystalline polyolefins can be employed in this invention. For example, a combination of low density polyethylene and polypropylene with the requisite sulfonated gum provides materials with improved properties for certain applications. The hardness and flexibility of the resulting composition can be controlled by the concentration and types of crystalline polyolefins comprising the blend. The addition of a crystalline ethylene-propylene copolymer in conjunction with low density polyethylene or polypropylene yields materials with a different physical property-processability balance which might be advantageous for certain applications.

It is apparent that the blends of crystalline polyolefins with sulfonated elastomers can also contain other agents. For example, the compositions of this invention can be further extended with other polymers such as polyvinyl chloride, polystyrene, ABS, polycarbonate, phenolic resin, nylon 6, nylon 66, styrene-butadiene block copolymers, styreneisoprene block copolymers and similar plastics or elastomers provided that said additives are in minor proportions of the overall blend and provided that the crystalline polyolefin and sulfonated elastomer are present in the critical proportions described above.

The crystalline polyolefin and the sulfonated polymer may be blended by techniques known in the art. For example, solutions of the two materials may be mixed and the resulting polymer blend removed by desolventization techniques or by solvent evaporation. Alternatively, the material can be dry compounded on a two roll mill. Other methods known in the art which are suitable for making the above blends include those methods commonly employed in the plastics and elastomer industries for mixing polymer systems. The elastomer industry has relied extensively on a high shear batch type mixing device called a Banbury. The highshear and resulting shear heating of viscoelastic materials provides excellent polymer blends of the type described in this invention in very short mixing times. Continuous mixing equipment can have economic advantages over batch mixing devices in terms of time and labor savings. One such device is known as the FCM, Farrel Continuous Mixer. A more efficient blend is achieved by an intermeshing-interlocking twin screw extruder. The desired degree of mixing is controlled by the screw elements along with polymer residence time at a given shear condition. While the Banbury mixing device is the preferred batch type mixer, the twin screw extruder is the preferred continuous mixer.

One method which is particularly suitable for preparing the instant blends involves the use of a polar material to break up the association of the sulfonate groups. The unassociated sulfonated polymer may be easily blended with the crystalline polyolefin and other additives desired by the skilled artisan. However, the polar material must be removed after blending to obtain the desirable properties of the instant blends. Thus, the polar compound is preferably a volatile material which is conveniently removed by heating or vacuum. The polar compounds useful in preparing the blends of the instant invention include the lower boiling alcohols and carboxylic acids, e.g. methanol, ethanol and acetic acid, as well as water.

The blends of the instant invention may additionally comprise various additives such as fillers and extender oils, for example, carbon blacks of both high and low structure, mineral fillers such as ground or precipitated calcium carbonates; delaminated, calcined or hydrated clays, silicas, and silicates. It is noted, however, that to obtain the desired properties which are the object of the instant invention, fillers and extender oils must be chosen so that as not to break up the association of the sulfonate groups.

The instant application is related to filed on the same day herewith, entitled "Blends of Sulfonated Elastomers Crystalline Polyolefins," in the names of R. D. Lundberg, R. R. Phillips, L. Westerman, and J. Bock. The difference between the inventions disclosed is that in the instant invention the sulfonated polymers used are limited to intractable polymers. Thus, the instant invention relates to processable blends based on intractable polymers having unexpectedly improved compression set properties. However, the blends of the instant invention are useful in the same applications as those described in the aforementioned patent application. In applications where good compression set properties are important, the instant materials would be preferred. The following are specific embodiments of the instant invention, but are illustrative and not intended to limit the scope of the claims.

EXAMPLE 1

This example will demonstrate the rheological characteristics of Sulfo-EPT gums at various sulfonate levels, and with various cations. In all cases it will be shown that the extrusion behavior is similar in some respects to ethylidene norbornene a covalently cross-linked ethylene-propylene terpolymer and further show that the viscosity values obtained with these materials are extremely high.

Throughout these studies an Instron Capillary Rheometer was employed to measure melt flow characteristics. Shear stress values at low shear rates (0.74 sec$^{-1}$) were used to characterize the flow behavior. These values of course are representative of the melt viscosities of these systems. Under these conditions, with measurement of the melt behavior of Sulfo-EPT gum at 200°C. it was observed that a number of these materials are unprocessable. These are listed in Table I.

The sulfonated elastomers used in this series of experiments were derived from an ethylene-propylene ethylidene norbornene (EPDM) terpolymer (about 50% ethylene, 45% propylene, 5% ENB), said polymer having a Mooney viscosity at 212°F. of about 20. The sulfonic acid levels are given in the tables in terms of meg. of acid/100 g. polymer and the neutralizations of said acids were performed in solution with 3 equivalents of metal acetate per equivalent of sulfonic acid to insure complete neutralization.

to poor products. Indeed at higher shear rates the extrudate from the rheometer is observed to be an incoherent crumb. Prior to the instant invention, there was no way of rendering these gums melt processable without major sacrifices in their elastic properties. It is possible to lower the sulfonation level in these systems to about 0.4 mole % and at this low level, melt processability is improved, but at the major sacrifice in physical properties. Of course, increasing the sulfonation level above that for the materials shown in Table I only renders the melt processability problem more severe. Clearly, these materials in this state must be considered unprocessable. The flow behavior is so poor that compression set measurements on melt processed materials would have little significance. Therefore, they were not made. Also due to the intractable nature of these materials, a fused specimen could not readily be obtained through compression molding and hence tensile properties were not obtained.

EXAMPLE 2

This series of examples will demonstrate that a sulfonated-EPDM with a sulfonate level which is even higher than those illustrated in Table II, can be modified to yield products which have much improved flow behavior as measured by shear stress at various shear rates at 200°C. The modification which is the subject of this invention is a blending of the unprocessable Sulfo-EPT gum with high density polyethylene or polypropylene. The resulting blends are then compression molded for compression set measurements at 70°C., and also examined in a capillary rheometer at 200°C. to determine melt flow characteristics.

The sulfonated elastomers are identical to those employed in Example 1 (i.e. the same sulfonate levels and series of cations were employed as well as the same starting EPT. However, in this series of Examples, the Sulfo-EPT gum has been blended with sufficient high density polyethylene (HDPE) such that the crystalline

TABLE I

RHEOLOGICAL CHARACTERISTICS OF SULFO-EPT GUMS

| Base Resin | Sulfonation Level[a] | Neutralization Agent | Apparent Shear Stress, dynes/cm$^2$×10$^{-5}$ | | | | Melt[b][c] Fracture | |
|---|---|---|---|---|---|---|---|---|
| | | | .74 Sec$^{-1}$ | 7.4 Sec$^{-1}$ | 74 Sec$^{-1}$ | 740 Sec$^{-1}$ | | |
| A | 20 | Zn(Ac)$_2$ | 13.8 | 31.5 | 62.0 | 93.6 | 29 sec$^{-1}$ | |
| A | 20 | Mg(Ac)$_2$ | 31.6 | 49.3 | 67.1 | 97.5 | .7 | Incoherent 285 |
| A | 20 | Ba(Ac)$_2$ | 29.5 | 49.2 | 65.1 | 91.3 | 1.5 | Incoherent 73 |
| A | 30 | Zn(Ac)$_2$ | 31.4 | 52.2 | 73.7 | 109.2 | .7 | |
| A | 30 | Mg(Ac)$_2$ | 35.5 | 52.7 | 70.2 | 110.0 | .3 | Incoherent 73 |
| A | 30 | Ba(Ac)$_2$ | 32.8 | 50.3 | 67.5 | 99.9 | .3 | Incoherent 147 |
| A | 40 | Zn(Ac)$_2$ | 39.2 | 61.2 | 78.0 | 118.6 | .3 | Incoherent 735 |
| A | 40 | Mg(Ac)$_2$ | 42.1 | 55.0 | — | — | .3 | Incoherent 15 |
| A | 40 | Ba(Ac)$_2$ | 38.6 | 53.8 | 69.4 | | .3 | Incoherent 15 |

[a]Sulfonation level is defined as the milliequivalents of sulfonic acid present in 100 gms. of the polymer.
[b]Melt Fracture is defined as that shear rate where the extrudate was clearly irregular and therefore demonstrated nonuniform flow.
[c]"Incoherent" behavior is defined as that type of flow behavior where the extrudate was so poorly fused that it would essentially behave as an aggregated crumb.

The important characteristic of these measurements shown in Table I is that they reflect melt flow behavior of materials which are unprocessable by any practical technique such as extrusion, injection molding or even rapid compression molding. It is possible in some cases to obtain a coherent film by long term compression molding of certain of these materials at high temperatures, but this is an impractical process which also leads polyolefin represents 35% by weight of the resulting blend.

The plastic employed was HDPE with a density of 0.96 gms./cc. and a melt index of 6.0. The level of crystallinity of this plastic was estimated to be 80 to 90%. The plastic blending was achieved with a Brabender mixing head attached to a Plasticorder at a temperature of 160°C. and 50 rpm rotor speed. The sulfonated gum and polyolefin was added alternately and mixing was completed after 8 minutes. The blends were then sheeted out on a 3 inches two roll mill for 3½ minutes at 160°C. It was observed that the molten blends appeared quite homogeneous except that at the very high sulfonate levels there was some evidence that the dispersion was not completely homogeneous. Nevertheless, these blends were achieved with little difficulty in all cases. The blends were then evaluated for their flow behavior as shown in Table IIa, their tensile properties as shown in Table IIb and their compression set as shown in Table IIc.

The samples for the various measurements were prepared as follows:

Compression Molding for Stress-Strain Measurements 20 mil micro pad pressed of each specimen. Preheated mold, 3' preheat, 4' press at 350°F., 20 tons. Cooled under 20 tons.

For Compression Set 40 mil 2¼ × 2¼ pads pressed of each specimen. Same conditions as above.

Compression Set at 70°C

From each 40 mil pad die cut twelve ½ inch discs. Made two stacks of 6 discs each sample. Placed in compression jig with shims providing 25% compression. Heated 22 hours in forced air oven at 70°C. Released compression and determined set after 30 minutes.

TABLE IIc-continued

Compression Set - 35% HDPE Blends
Set after 30 Minutes

| Counter-ion | Sulfonic Acid Level | Room Temp. | 70°C. |
|---|---|---|---|
| | 30 | 40 | 82 |
| | 40 | 45 | 74 |
| Mg | 20 | 37 | 71 |
| | 30 | 30 | 66 |
| | 40 | 36 | 71 |
| Ba | 20 | 38 | 72 |
| | 30 | 34 | 74 |
| | 40 | 34 | 72 |

Several surprising and very important observations can be obtained from the data in the Tables above and associated observations of this experimental series. In all cases these plastic blends were compression molded with ease to yield strong compression molded pads. Furthermore, the shear stress values for the blends of this example are 1/5 to 1/9 that of respective Sulfo-EPT gum as shown in Table I. The shear rate for melt fracture is dramatically changed so that uniform extrusion is achieved at much higher shear rates than was possible with the Sulfo-EPT gum. In addition, the extrudates were generally strong, smooth, and uniform indicative of excellent flow behavior except in several cases (i.e. Ba cation at high sulfonate levels) but even here there was observed substantial flow improvement over the Sulfo-EPT gums.

TABLE IIa

Rheology, 35% HDPE Blends at 200°C.

| Counter-ion | Sulfonic Acid Level | Shear Stress, dynes/cm² × 10⁻⁵ | | | | Melt Fracture Shear Rate, sec⁻¹ | Comments |
|---|---|---|---|---|---|---|---|
| | | 0.74 sec⁻¹ | 7.4 sec⁻¹ | 74 sec⁻¹ | 740 sec⁻¹ | | |
| Zn | 20 | 2.1 | 6.3 | 19.5 | Pulsates | DEF at 735 | No bubbles |
| | 30 | 3.0 | 9.1 | 27.0 | Pulsates | MF at 735 | No bubbles |
| | 40 | 3.5 | 10.1 | 28.1 | Pulsates | Sl at 295, out of MF at 735 | Distorted at 2939 |
| Mg | 20 | 4.7 | 11.8 | 27.5 | Pulsates | Sl at 147, DEF at 295 | No MF > 735 sec⁻¹ |
| | 30 | 4.2 | 11.2 | 27.5 | Pulsates | MF at 295 | Matte finish |
| | 40 | 4.8 | 12.1 | 30.2 | Pulsates | Rough strands No severe fracture | Slight distortion |
| Ba | 20 | 5.7 | 13.1 | 30.0 | Pulsates | DEF at 73, out of MF at 735 | Distorted at 2939 |
| | 30 | 5.2 | 12.6 | 29.3 | Pulsates | DEF at 147 | |
| | 40 | 7.6 | 16.9 | 36.7 | Pulsates | DEF at 147 | Rough strands |

TABLE IIb

Stress-Strain, 35% HDPE Blends of Sulfo-EPT

| Counter-ion | Sulfonic Acid Level | Room Temperature | | | | 100°C. | | | | |
|---|---|---|---|---|---|---|---|---|---|---|
| | | 100% Modulus psi | $R^{23}_{100}$ | Tensile at Break psi | $R^{23}_{100}$ | Elong % | 100% Modulus psi | Tensile at Break psi | Elong % | Yield psi |
| Zn | 20 | 710 | 3.6 | 1425 | 8.4 | 520 | 195 | 170 | 135 | 205 |
| | 30 | 900 | 2.6 | 1755 | 4.9 | 465 | 350 | 355 | 195 | — |
| | 40 | 1000 | 2.9 | 2290 | 6.8 | 485 | 340 | 335 | 200 | — |
| Mg | 20 | 750 | 2.5 | 1590 | 5.2 | 610 | 300 | 305 | 165 | — |
| | 30 | 1035 | 2.0 | 1610 | 3.1 | 355 | 505 | 515 | 125 | — |
| | 40 | 1090 | 2.6 | 2095 | 4.8 | 470 | 415 | 435 | 190 | — |
| Ba | 20 | 820 | 2.1 | 1685 | 4.0 | 525 | 400 | 420 | 130 | — |
| | 30 | 1070 | 2.1 | 1505 | 3.0 | 335 | — | 500 | 95 | — |
| | 40 | 1275 | 2.3 | 2050 | 3.5 | 370 | 565 | 575 | 110 | — |

TABLE IIc

Compression Set - 35% HDPE Blends
Set after 30 Minutes

| Counter-ion | Sulfonic Acid Level | Room Temp. | 70°C. |
|---|---|---|---|
| Zn | 20 | 48 | 83 |

The physical properties of these blends are shown in Table IIb. Again there are some important and surprising observations for these materials. The tensile strengths observed at room temperature are good, representative of strong but somewhat elastomeric compositions possessing good elongations. At 100°C. the tensile strengths are also very high, indicative of substantial strength at elevated temperatures for these materials. Additional insight into this surprising development will be shown in a subsequent example where typically low tensile properties at 100°C. for other plastic blends will be shown. This observation of tensile properties at 100°C. and room temperature can be quantified by the Ratio:

$$R^{23}{}_{100} \equiv \frac{\text{Tensile Strength at 23°C.}}{\text{Tensile Strength at 100°C.}}$$

This ratio is provided in Table IIb where it is evident that values of $R^{23}{}_{100}$ vary from 3.0 to 8.4 but generally are about 3 to 5. It would be most desirable to have this value as low as possible so as to preserve the high strength of these materials at elevated temperatures.

The compression set values for the blends of this Example are shown in Table IIc. It is very significant that these blends have compression set values at 70°C. as low as 66% (or 34% recovery) after prolonged deformation. Plastic blends wherein the Sulfo-EPT gum does not meet the requirements of this invention usually have compression set values at 70°C. in the ranges of 90 to 100%, or from 0 to 10% recovery. It is seen that the products of this invention indeed have excellent compression set values.

Thus it has been demonstrated that the blends of this Example have an outstanding combination of good rheological behavior, good tensile properties, especially at 100°C., and good compression set.

EXAMPLE 3

The same sulfonated EPT material employed in Example 1 were examined in this example except that a preferential plasticizer, stearic acid, was present at a level of 3 equivalents per equivalent of sulfonic acid. The flow behavior of these plasticized Sulfo-EPT gums is shown in Table III. It is clear that the presence of stearic acid dramatically lowers the melt viscosity of these materials. It is proposed that this occurs due to a selective interaction with the ionic groups resulting in their dissociation at elevated temperatures (~200°C.).

TABLE III

RHEOLOGICAL CHARACTERISTICS OF SULFO-EPT GUMS CONTAINING STEARIC ACID

| Sulfonation Level | Neutralization Agent* | Apparent Shear Stress dynes/cm²×10⁻⁵ | | | | M.F. |
|---|---|---|---|---|---|---|
| | | .74 sec⁻¹ | 7.4 sec⁻¹ | 74 sec⁻¹ | 740 sec⁻¹ | |
| 20 | Zn(Ac)₂ | 2.1 | 6.9 | 18.7 | 39.0 | 1469 |
| 20 | Mg(Ac)₂ | 6.8 | 17.2 | 35.5 | 67.1 | 295 |
| 20 | Ba(Ac)₂ | 11.1 | 26.5 | 51.5 | 77.2 | 15 |
| 30 | Zn(Ac)₂ | 2.6 | 8.4 | 20.9 | 42.5 | 2939 |
| 30 | Mg(Ac)₂ | 8.7 | 20.7 | 44.1 | 68.6 | 73 |
| 30 | Ba(Ac)₂ | 15.2 | 33.9 | 55.4 | 79.6 | 7 |
| 40 | Zn(Ac)₂ | 2.0 | 6.7 | 17.9 | 35.3 | |
| 40 | Mg(Ac)₂ | 17.9 | 30.8 | 49.2 | 75.7 | .7 |
| 40 | Ba(Ac)₂ | 15.4 | 34.3 | 55.8 | 81.1 | 7 |

*Also containing 3 equivalents stearic acid per sulfonic acid group.

EXAMPLE 4

The Sulfo-EPT gums of Example 3 were blended with HDPE in the same manner as in Example 2. The measurements were conducted in a manner very similar to those of Example 2. The flow behavior of these materials is shown in Table IVA. These data can be compared with the data of Table IIa and it can be generally observed that the presence of stearic acid lowers the shear stress at a given shear rate by about ⅓ and also improves the shear rate for melt fracture to some extent.

TABLE IVA

RHEOLOGY* OF SULFO-EPT Blends Containing 35% HDPE AND STEARIC ACID

| Counter-ion | Sulfonic Acid Level | Shear Stress, dynes/cm² × 10⁵ | | | | Onset of Melt Fracture Shear Rate, sec⁻¹ | Comments |
|---|---|---|---|---|---|---|---|
| | | 0.74 sec⁻¹ | 7.4 sec⁻¹ | 74 sec⁻¹ | 740 sec⁻¹ | | |
| Zn | 20 | 0.86 | 3.3 | 10.9 | 28.6 | In and out at 2939 | S1 distortion at 1469 |
| | 30 | 0.94 | 3.6 | 12.2 | 33.3 | DEF MF at 2939 | Die swell at 735 |
| | 40 | 1.0 | 3.7 | 12.4 | 34.3 | DEF MF at 2939 | Distorted to 1469 Die swell at 735 |
| Mg | 20 | 1.4 | 4.6 | 14.8 | 37.1 | MF at 735, out at 1469 | Distorted at 2939 |
| | 30 | 1.6 | 5.5 | 19.1 | Pulsates | DEF MF at 735 | Distorted at 295 |
| | 40 | 2.0 | 6.8 | 19.7 | 47.6 | DEF MF at 735 | Distorted at 147 |
| Ba | 20 | 2.3 | 7.1 | 21.5 | Pulsates | DEF MF at 735 | Distorted at 147 |
| | 30 | 2.3 | 8.7 | 24.7 | Pulsates | DEF MF at 295 | Distorted at 73 |
| | 40 | 2.1 | 7.7 | 22.2 | Pulsates | DEF MF at 295 | Distorted at 73 |

*Measured at 200°C.

The physical properties of the blends of this Example are presented in Table IVB. It is immediately evident that while the room temperature tensile properties are quite similar to those in Table IIb, the properties at 100°C. are markedly different. Indeed the tensile properties in Table IIb at 100°C. are some 5 to 9 times greater than those in Table IVB. This remarkable difference is quantified in the ratio of tensile strength at break:

$$R^{23}_{100} \equiv \frac{\text{Tensile Strength at Room Temperature}}{\text{Tensile Strength at 100°C.}}$$

It is seen that for the data in Table IVB, this ratio is on the order of 20 to 60 while this same ratio generally varied from 3 to 8 for the blends without stearic acid plasticizer. Because low values for this ratio are highly desirable, this finding is of considerable importance.

TABLE IVB

STRESS-STRAIN, 35% HDPE BLENDS OF SULFO-EPT WITH STEARIC ACID

| Counter-ion | Sulfonic Acid Level | Room Temperature | | | | 100°C. | | | |
|---|---|---|---|---|---|---|---|---|---|
| | | 100% Modulus psi | Tensile at Break psi | $R^{23}_{100}$ | Elong % | 100% Modulus psi | Tensile at Break psi | Elong % | Yield psi |
| Zn | 20 | 795 | 1190 | 26 | 525 | 55 | 45 | 115 | 90 |
| | 30 | 775 | 1260 | 19 | 525 | 90 | 65 | 120 | 130 |
| | 40 | 1020 | 2360 | 59 | 520 | 65 | 40 | 115 | 110 |
| Mg | 20 | 795 | 1730 | 31 | 560 | 65 | 55 | 110 | 100 |
| | 30 | 895 | 1735 | 31 | 470 | 95 | 55 | 210 | 125 |
| | 40 | 1085 | 3055 | 61 | 565 | 70 | 50 | 135 | 110 |
| Ba | 20 | 845 | 2015 | 27 | 525 | 100 | 75 | 145 | 125 |
| | 30 | 925 | 2010 | 25 | 435 | 145 | 80 | 320 | 160 |
| | 40 | 1205 | 2960 | 35 | 475 | 125 | 85 | 210 | 155 |

Finally, the compression set values for the blends of this example are provided in Table IVC. As indicated previously, the compression set of these blends is considerably worse than those described in Table IIc. In fact, the recovery at 70°C. after this test is on the order of 0 to 7% for the blends of this example, but ranges from 17 to 34% for the blends of Example 2.

TABLE IVC

COMPRESSION SET — 35% HDPE BLENDS OF SULFO-EPT WITH STEARIC ACID

| Counter-ion | Sulfonic Acid Level | Set after 30 Min. Room Temp. | 70°C. |
|---|---|---|---|
| Zn | 20 | 74 | 97 |
| | 30 | 69 | 100 |
| | 40 | 74 | 98 |
| Mg | 20 | 70 | 95 |
| | 30 | 63 | 96 |
| | 40 | 72 | 93 |
| Ba | 20 | 71 | 97 |
| | 30 | 62 | 98 |
| | 40 | 70 | 94 |

The data in this example clearly show that the presence of stearic acid at the levels shown here result in a substantial loss in the physical properties which are the object of this invention. It is clear that the desirable gums that are within the specifications of this invention will give the desired properties and also give good flow behavior while those gums outside these specification will have undesirable properties in the resulting blends.

EXAMPLE 5

Previous experiments have shown that blends of high density polyethylene with a suitable Sulfo-EPT results in a material with excellent melt flow behavior and excellent physical properties. These same characteristics are observed with other crystalline polyolefins, specifically low density polyethylene (LDPE) and polypropylene (PP) as this example will show.

The sulfonated elastomers used in this series of experiments was derived from an ethylene-propylene ethylidene norbornene (ENB) terpolymer (about 50% ethylene, 45% propylene, 5% ENB), said polymer having a Mooney viscosity at 212°F. of about 20. The sulfonic acid levels are given in the tables in terms of meq. of acid/100 g polymer and the neutralizations of said acids were performed in solution with 3 equivalents of metal acetate per equivalent of sulfonic acid to insure complete neutralization.

Essentially four Sulfo-EPDM gums were employed, two levels of sulfonate (20 and 30 meq/100 g polymer) and two cations (zinc and magnesium). The materials are abbreviated as Zn-20, Mg-20, Zn-20 and Mg-30 to denote sulfonate level and cation type.

These gums were blended with low density polyethylene having a melt index of 30 and a crystallinity level of about 45%, and with isotactic polypropylene, both plastics being present at a level of 35% in the final blend. The proceedings described in Example 2 were employed to blend these materials.

The melt flow behavior was measured as described in previous examples. A summary of the appropriate data is shown in Table Va. Based on these data, it is evident that all the samples would be suitable for extrusion, compression molding, and injection molding.

TABLE Va

RHEOLOGICAL CHARACTERISTICS OF BLENDS OF SULFO-EPT WITH LDPE AND PP AT 200°C.

| Sample | Shear Stress dynes/cm²×10⁻⁵ 0.74 sec⁻¹ | Melt Fracture Shear Rate, sec⁻¹ |
|---|---|---|
| Zn-20 LDPE | 3.0 | Distortion at 735 Smooth at 2939 |
| Zn-20 PP | 3.1 | No MFR |
| ZN-30 LDPE | 3.2 | No MFR |
| Zn-30 PP | 3.6 | No MFR |
| Mg-20 LDPE | 4.5 | No MFR |
| Mg-20 PP | 4.5 | No MFR |
| Mg-30 LDPE | 4.4 | No MFR |
| Mg-30 PP | 4.7 | Slight MFR at 1467 |

The physical properties of these blends were measured at room temperature and at 100°C. (Table Vb). It is immediately apparent from those data that these blends are strong and elastomeric at room temperature, but also possess good tensile properties at 100°C., especially the blends with polypropylene. Indeed, tensile strengths as high as 500 psi are achieved with such blends. These properties are remarkable in view of the excellent flow behavior at 200°C.

TABLE Vb

PHYSICAL PROPERTIES OF BLENDS OF SULFO-EPDM WITH LDPE AND PP AT 23°C.

| Sample | 100% Modulus Psi | Tensile Psi | Elongation % |
|---|---|---|---|
| Zn-20 LDPE | 483 | 1341 | 517 |
| Zn-20 PP | 1401 | 1658 | 325 |

TABLE Vb-continued

| | | | |
|---|---|---|---|
| Zn-30 LDPE | 560 | 1265 | 410 |
| Zn-30 PP | 1558 | 1771 | 220 |
| Mg-20 LDPE | 506 | 1349 | 560 |
| Mg-20 PP | 1679 | 1690 | 112 |
| Mg-30 LDPE | 604 | 1601 | 512 |
| Mg-30 PP | 1447 | 1746 | 237 |

PHYSICAL PROPERTIES OF BLENDS OF SULFO-EDPM WITH LDPE AND PP AT 100°C.

| Sample | Yield | 100% Modulus Psi | Tensile Psi | Elongation % |
|---|---|---|---|---|
| Zn-20 LDPE | — | 109 | 111 | 153 |
| Zn-20 PP | 530 | 515 | 518 | 100 |
| Zn-30 LDPE | — | — | 174 | 80 |
| Zn-30 PP | 598 | 582 | 564 | 130 |
| Mg-20 LDPE | — | — | 147 | 58 |
| Mg-20 PP | — | — | 681 | 83 |
| Mg-30 LDPE | — | — | 164 | 45 |
| Mg-30 PP | 559 | 560 | 549 | 140 |

The blends of this example were examined with respect to their compression set behavior in the same manner as described in Example 2. The data are summarized in Table Vc.

These data, rheology, physical properties, and compression set, clearly identify these blends of Sulfo-EPT with crystalline polyolefins as having an unusual and very desirable balance of flow behavior and excellent property profile. It has already been shown that the ionic elastomer must be of a particular type in order that the blends have these desirable properties. It will be shown in subsequent examples that the plastic additive must meet the constraints described above in order for the resulting blend to have the balance of flow behavior and physical properties which is the object of this invention.

TABLE Vc

COMPRESSION SET AT ROOM TEMPERATURE (30′ RECOVERY)

| Sample | 30 Minutes |
|---|---|
| Zn-20 LDPE | 28.2 |
| Zn-20 PP | 39.5 |
| Zn-30 LDPE | 29.5 |
| Zn-30 PP | 48.2 |
| Mg-20 LDPE | 21.6 |
| Mg-20 PP | 35.9 |
| Mg-30 LDPE | 23.3 |
| Mg-30 PP | 44.7 |

COMPRESSION SET AT 70°C. (30′ RECOVERY)

| Sample | 30 Minutes |
|---|---|
| Zn-20 LDPE | 80.4 |
| Zn-20 PP | 79.2 |
| Zn-30 LDPE | 77.0 |
| Zn-30 PP | 81.7 |
| Mg-20 LDPE | 75.3 |
| Mg-20 PP | 72.8 |
| Mg-30 LDPE | 78.2 |
| Mg-30 PP | 80.2 |

EXAMPLE 6

The previous examples in this invention have clearly shown that a suitable Sulfo-EPT gum is required to create a blend having a suitable balance of physical properties and flow behavior. If that gum does not have a sufficient degree of ionic association at elevated temteratures (i.e. shear stress at 200°C.), it will not be suitable. It is important to emphasize that the plastic must also meet the critical parameters previously shown in the specification. This example will compare a Sulfo-EPT gum (neutralized with magnesium acetate at a sulfonic acid level of 30 meq — the same gum employed in Example 2 based on Mg(Ac)₂ and 30 meq sulfonate) blended with:

A. High density polyethylene; 0.96 density which meets our specifications.

B. A rubber process oil, commercially known as Flexon 845*.

*Flexon 845 is an oil consisting of about 15% aromatics and about 84% saturates, which has a refractive index at 20°C. of 1.4755, a specific gravity at 60°F. of 0.8649 and a viscosity at 100°F. of 31.9 centistokes. Flexon 845 is available from Exxon Chemical Company.

C. An ethylene propylene ethylidene norbornene terpolymer having a Mooney viscosity of about 40, an ethylene content of 50%, a propylene content of 45% and an ethylidene norbornene (ENB) content of about 5%.

D. At atactic (noncrystalline polypropylene).

E. A commercial polystyrene sample which is noncrystalline and has a number average molecular weight of about 180,000.

All of these materials were blended with the Sulfo-EPDM gum at an additive level of 54 parts per hundred of gum. The flow behavior of the blends was then determined, and the room temperature tensile properties determined. The data are presented in Table VI.

An inspection of these data immediately reveals that only the blend with the crystalline polyolefin (HDPE) provides a suitable balance of good flow behavior and good physical properties. It is apparent that the addition of the process oil results in a blend with poor flow behavior and rather borderline physical properties. Both blends with EPDM and atactic polypropylene have very poor tensile properties and also rather poor flow behavior. It is interesting that the blend with atactic polypropylene has a rather low viscosity but extrudes nonuniformly as judged by the early onset of melt fracture. Finally, the polystyrene additive provides a blend with very short (i.e. nonelastic) elongations and poor extrusion behavior.

These data clearly demonstrate the importance of selecting the plastic additive. It is clear that the crystalline polyolefins are remarkable in that the blends based on these systems provide a very desirable combination of good flow behavior and excellent physical properties.

TABLE VI

RHEOLOGICAL AND PHYSICAL PROPERTIES OF VARIOUS ADDITIVES WITH SULFO-EPT

| Blend | Sample | Shear Stress at .74 sec⁻¹ dynes/cm¹ × 10⁻⁵ | Onset of Definite Melt Fracture Shear Rate, sec⁻¹ | Room Temperature Tensile Properties Tensile Strength at Break psi | Elongation at Break % |
|---|---|---|---|---|---|
| 1 | A + 54 phr HDPE | 4.2 | 295. | 1608 | 355 |
| 2 | A + 54 phr Flexon 845 oil | 9.12 | 7.4 | 776 | 430 |
| 3 | A + 54 phr B | 6.16 | 73.5 | 120 | 187 |
| 4 | A + 54 phr Atactic Polypropylene | .39 | .735 | 269 | 130 |

TABLE VI-continued
RHEOLOGICAL AND PHYSICAL PROPERTIES OF VARIOUS ADDITIVES WITH SULFO-EPT

| Blend | Sample | Shear Stress at .74 sec$^{-1}$ dynes/cm$^2$ × 10$^{-5}$ | Onset of Definite Melt Fracture Shear Rate, sec$^{-1}$ | Room Temperature Tensile Properties Tensile Strength at Break psi | Elongation at Break % |
|---|---|---|---|---|---|
| 5 | A + 54 phr Polystyrene | 3.98 | .735 | 645 | <10 |

A. Sulfo-EPT Mg(Ac)$_2$ neutralized 30 meq
B. EPDM

What is claimed is:

1. A composition of matter which comprises a blend of an intractable ionic elastomer, said elastomer consists essentially of sulfonated nonaromatic hydrocarbon polymers, said elastomer comprising a continuous phase of said blend and said elastomer being characterized as having a shear stress as measured at a shear rate of 0.74 sec$^{-1}$ of at least 1 × 10$^6$ dynes/cm$^2$ at 200°C, and from 10 to 90 parts per hundred elastomer of a crystalline polyolefin having a degree of crystallinity of at least 25%.

2. Composition of claim 1 wherein said sulfonated polymer comprises from about 0.2 to about 20 mole % sulfonate groups at least 95% of which are combined with a counterion selected from the group consisting of Groups I and II of the Periodic Table of the Elements, aluminum, zinc, lead and mixtures thereof.

3. The composition of claim 2 wherein said sulfonated polymer comprises from about 0.2 to about 5.0 mole % sulfonate groups.

4. Composition of claim 2 wherein said crystalline polyolefin is selected from the group consisting of polyethylene, polypropylene, and ethylene propylene copolymers, having a degree of crystallinity of at least 40%.

5. The composition of claim 2 wherein said sulfonated elastomer is prepared by neutralizing a sulfonic acid polymer with a basic material wherein the cation is selected from the group consisting of Groups IA, IB, IIA, and IIB of the Periodic Table of the Elements, aluminum, antimony, lead and mixtures thereof.

6. Composition of claim 2 wherein said crystalline polyolefin is added at a level of from 20 to 90 parts per hundred sulfonated elastomer.

7. Composition of claim 2 wherein said sulfonated polymer is selected from the group consisting of sulfonated butyl polymers and sulfonated ethylene-propylene terpolymers.

8. Composition of claim 7 wherein said sulfonated polymer is a sulfonated ethylene-propylene terpolymer.

9. Composition of claim 8 wherein said crystalline polyolefin has a melting point of at least 70°C.

10. Composition of claim 9 wherein said crystalline polyolefin is polypropylene.

11. The composition of claim 9 wherein the crystalline polyolefin is polyethylene.

12. The composition of claim 9 wherein said crystalline polyolefin is polybutene-1.

* * * * *